April 27, 1926.

P. BACON 1,582,624

VALVE FOR PNEUMATIC TIRES OR THE LIKE

Filed May 9, 1924

Inventor
Preston Bacon,
By his Attorneys,

Patented Apr. 27, 1926.  1,582,624

UNITED STATES PATENT OFFICE.

PRESTON BACON, OF BRONXVILLE, NEW YORK, ASSIGNOR TO A. SCHRADER'S SON, INCORPORATED, OF BROOKLYN, NEW YORK, A CORPORATION OF NEW YORK.

VALVES FOR PNEUMATIC TIRES OR THE LIKE

Application filed May 9, 1924. Serial No. 711,947.

*To all whom it may concern:*

Be it known that I, PRESTON BACON, a citizen of the United States of America, residing in Bronxville, in the county of Westchester and State of New York, have invented certain new and useful Improvements in Valves for Pneumatic Tires or the like, of which the following is a specification.

This invention relates to valves for pneumatic tires or the like, and aims to provide certain improvements therein.

The invention is directed to a valve preferably having an integral seat for the valve check, whereby the necessity of a separate seat having a packing is avoided. According to the preferred form of the invention, the valve shell is formed in two parts, a lower part which is connected to the inner tube of the tire, and an upper part which is screwed down over the lower part, the construction being such that the joint between the upper and lower parts is located at the valve seat, so that when the valve check is in position on its seat, this joint is covered. It is sufficient if the valve check makes a tight fit with that portion of the seat which is formed on the lower part of the valve shell, the construction of the upper part of the shell being designed largely for the purpose of providing a mechanical obstruction to the blowing out of the valve check under pressure. The invention includes certain other features of improvement which will be hereinafter more fully pointed out.

Referring to the drawings, which illustrate one form of the invention,—

Figure 3:
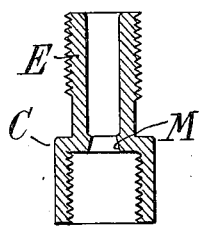
Figs. 3, 4, 5, 6 and 7 illustrate the various parts of the device separated.
Figure 4:
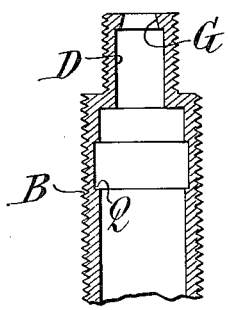
Figure 5:
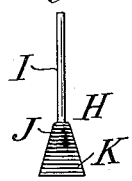

Referring to the drawings, let A indicate the valve as a whole, the shell of which comprises a lower section B and an upper section C. The lower section B preferably has a reduced portion D which is designed to screw into the foot of the upper section C, and the upper section C has a nipple E which is adapted to receive the pump coupling or valve cap F.

Figure 1:
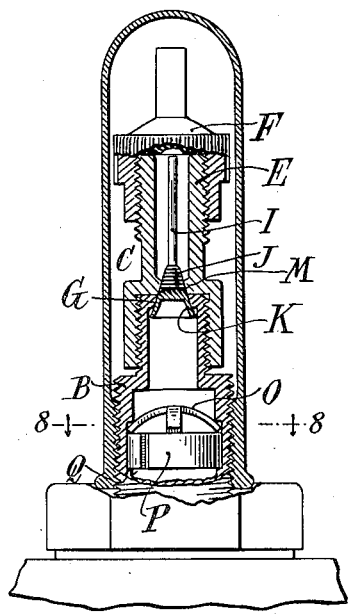
Figure 1 is a diametrical section of a valve, showing the valve check in place.
Figure 8:
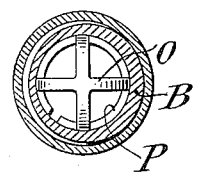
Fig. 8 is a section on the line 8—8 of Fig. 1.

It will be noted that at the top of the lower section B is a valve seat G which is preferably tapered, as shown, and is designed to engage the valve check H, the latter being provided with the usual deflating pin I. The valve check H is best tapered to correspond with the seat G, and when in its upper position, as shown in Fig. 1, forms a closure for the opening through the seat.

The valve check H may be made of any material desired for the purpose, and in the case of a top repair valve it should have sufficient compressibility to pass into the lower section B of the valve through the opening of the seat G. To facilitate this, the valve may be made of a cone of rubber having a solid upper portion J and a thinner skirt K. When the skirt is compressed, it will pass easily through the seat G. However, the construction thus far described would not be especially satisfactory for valves which are designed to stand severe pressures, such as motor-tire valves, and I have, therefore, formed the upper section C with a part which mechanically opposes the blowing out of the valve check. The diameter of the opening through such part may be considerably less than that of the seat G, as the check H need not be passed through the same. Such constricted part is shown at M, and is preferably formed as a continuation of the seat G, it being designed to contact in the specific instance shown with the solid portion J of the check H. It results from this construction that when the valve check is in its closed position, a tight joint is made with the seat G and also with the seat M. If the upper member C is fitted to the lower member B with a leak-tight joint, a proper contact with the seat section M by the check H will also insure a leak-tight joint, irrespective of whether there is a seating contact between the check and the seat G or not. I prefer, however, to make a leak-tight contact with both seats, which is possible in the present construction, since when the check is arrested by the upper seat M, the cone-shaped form of check will insure a proper contact with both seats, and this is particularly true when the check H is provided with a skirt K, whereby the internal pressure will move it outwardly against the seat G.

Figure 6:
Figure 7:
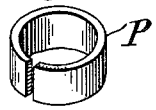
Figure 2:
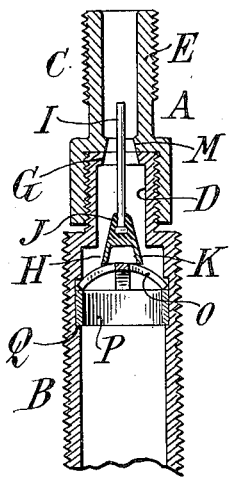
Fig. 2 is a similar section with the valve check open.
Figure 9:
Fig. 9 is a view of a modified form of stop.

A suitable stop, such as O, is best arranged for limiting the downward movement of the check, which stop may be constructed as shown in Fig. 6, and may rest upon an expanding ring P introduced within the valve casing, a shoulder, such as Q, being preferably used to support the ring P. Or the modification illustrated in Fig. 9 may be used in which the ring P' is provided with a series of tongues which are bent inwardly, as shown at P², to form a stop for the valve check while still permitting the air to pass through it.

The pin I of the valve check is preferably of sufficient length to lie approximately at the top of the section C of the valve casing, so that it can be easily used for inflating and gauging purposes.

While I have shown and described one form of the invention, it is understood that I do not wish to be limited thereto, since various changes may be made therein without departing from the spirit of the invention.

What I claim is:—

1. In a valve for pneumatic tires or the like, a valve casing having a tapered seat, a valve check adapted to be inserted through said seat, and means lying above said seat for preventing blowing out of said valve check, said means comprising a member having a part forming a continuation of said valve seat.

2. In a valve for pneumatic tires or the like, the combination of a valve casing, comprising two parts, the lower member of which has a tapered internal seat, and the upper member of which has a tapered internal seat which forms a continuation of said first-named seat, and a tapered valve check within the valve casing adapted to make contact with both said seats.

3. In a valve for pneumatic tires or the like, the combination of a valve casing having a tapered integral seat, a tapered valve check adapted to be inserted through said seat, the lower part of said valve check being hollow and normally of larger diameter than the smallest diameter of the valve seat, said valve check being adapted to make contact with said seat, and a member on said valve casing above said seat for preventing blowing out of said valve check.

4. In a valve for pneumatic tires or the like, a tapered or conical valve check composed of compressible material, said valve check having a solid upper portion and a depending skirt forming a hollow lower portion.

In witness whereof, I have hereunto signed my name.

PRESTON BACON.